United States Patent [19]
Mauch et al.

[11] 3,796,940
[45] Mar. 12, 1974

[54] BATTERY POWER SUPPLY, MAINTENANCE FREE

[75] Inventors: Robert E. Mauch; Robert I. Sarbacher, both of Santa Monica, Calif.

[73] Assignee: John C. Bogue, Santa Monica, Calif.

[22] Filed: Dec. 27, 1971

[21] Appl. No.: 212,178

[52] U.S. Cl............................ 320/14, 320/21, 320/44
[51] Int. Cl................................................. H02j 7/00
[58] Field of Search.................... 320/14, 21, 43–45; 307/37, 38, 66, 43, 46, 48–50

[56] References Cited
UNITED STATES PATENTS
3,526,822  9/1970  Dickfeldt et al..................... 320/14
3,417,307  12/1968  Kosa et al........................ 320/14 X
3,421,067  1/1969  Wilson et al....................... 320/14

Primary Examiner—D. F. Duggan
Assistant Examiner—Robert J. Hickey
Attorney, Agent, or Firm—Witherspoon and Lane

[57] ABSTRACT

A power supply which automatically provides the necessary maintenance cycling for secondary batteries according to a predetermined schedule is disclosed. The power supply is designed to eliminate the detrimental effects of long idle periods during which the battery is not used. This system will, at a predetermined time, or at the end of a predetermined period, cause the battery to go through a discharge-charge cycle. Several embodiments of the invention are disclosed.

16 Claims, 5 Drawing Figures

INVENTORS:
ROBERT E. MAUCH.
R. I. SARBACHER.

INVENTORS.
ROBERT E. MAUCH.
R. I. SARBACHER.

3,796,940

BATTERY POWER SUPPLY, MAINTENANCE FREE

BACKGROUND OF THE INVENTION

This invention relates to maintenance cycling of secondary batteries in a power supply; and, more particularly, to a power supply that provides automatic maintenance cycling of its secondary batteries.

Storage batteries which are maintained in a charged state continuously may show marked capacity deterioration. This problem can be avoided by periodically cycling the batteries through a discharge-charge cycle. At present this periodic cycling is usually accomplished by manual maintenance scheduling. Such scheduling is costly and often inconvenient.

This invention provides the maintenance cycling automatically. The batteries are periodically discharged and charged automatically. No human operation of any kind is necessary with this invention after it has been installed in the power supply. The battery or batteries or cells of a battery are automatically cycled at periodic intervals.

SUMMARY OF THE INVENTION

This invention provides an automatic system for maintenance cycling of secondary batteries that are continuously maintained in a charged condition. The battery or batteries are automatically removed one at a time from the charger, discharged and placed back across the charger for recharging. This cycling is carried on periodically. The time between discharge cycles is controlled by a coulometer or the like.

In one embodiment of the invention, power cannot be supplied to a load during cycling. In another embodiment power is available to the load at all times, including the times at which a discharge cycle is taking place. In yet another embodiment of the invention, the individual cells of a battery of cells are periodically discharged and then recharged. If a cell becomes defective an indicator is provided to indicate that a defective cell exists. However, the circuitry is such that the battery can still be operated with only a slight effect until the defective cell is replaced. With the single cell cycling embodiment power is also available to the load at all times.

In addition to the maintenance cycling embodiments, a sequencing system for the single cell embodiment is disclosed. In this sequencing system additional cells are added as needed to maintain the voltage available to the load at a particular value. Thus, for example during the discharge cycle of a cell another cell not normally needed to maintain the desired voltage will be automatically added to the battery. Similarly, if one or more cells become defective one or more of the additional cells will be added to the battery.

DESCRIPTION OF THE INVENTION

A full understanding of the invention can be obtained from the following detailed description when read in conjunction with the annexed drawing in which.

DETAILED DESCRIPTION OF THE INVENTION

Figure 1:
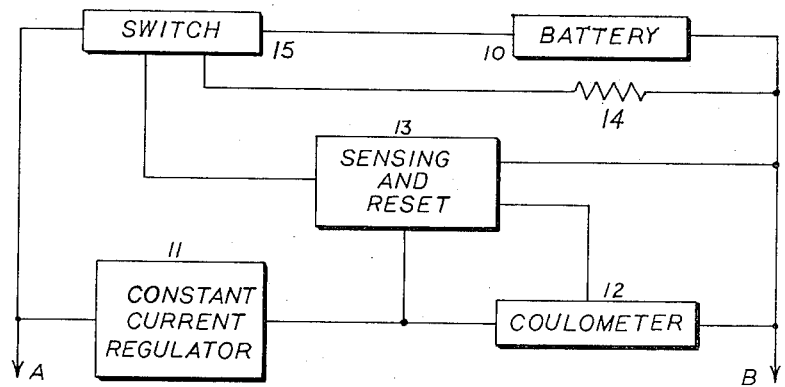
FIG. 1 shows an embodiment of the invention in which power is not available during the cycling period.

When power is not required from the battery during the cycling period, the system shown in FIG. 1 may be used. This system contains a battery 10 in series with a switch 15. Battery 10 and switch 15 are connected through the terminals A and B to a conventional charger and load, not shown. The charger maintains battery 10 in a fully charged state. The constant current regulator 11 and the coulometer 12 comprise a timing network which measures the amount of time that the battery has been on charge, or that the system has been active. At a predetermined time, say 6 months, the coulometer reaches its end point and the sensing and reset device 13 activates switch 15 which causes battery 10 to be disconnected from terminals A and B and connected across the substitute load 14, thus discharging the battery. During battery discharge, sensing and reset unit 13 resets coulometer 12 to its starting point. At the end of the discharge time switch 15 returns to its normal position, disconnecting substitute load 14 and reconnecting battery 10 accross the terminals A and B. At this time the battery charger will return the battery to its fully charged state, thus completing the full discharge-charge cycle. With this system, power cannot be drawn from storage battery 10 while the discharge-charge cycle is in operation. It should be apparent that additional batteries can be connected directly in parallel with battery 10. These additional batteries would be cycled simultaneously with battery 10.

Figure 2:
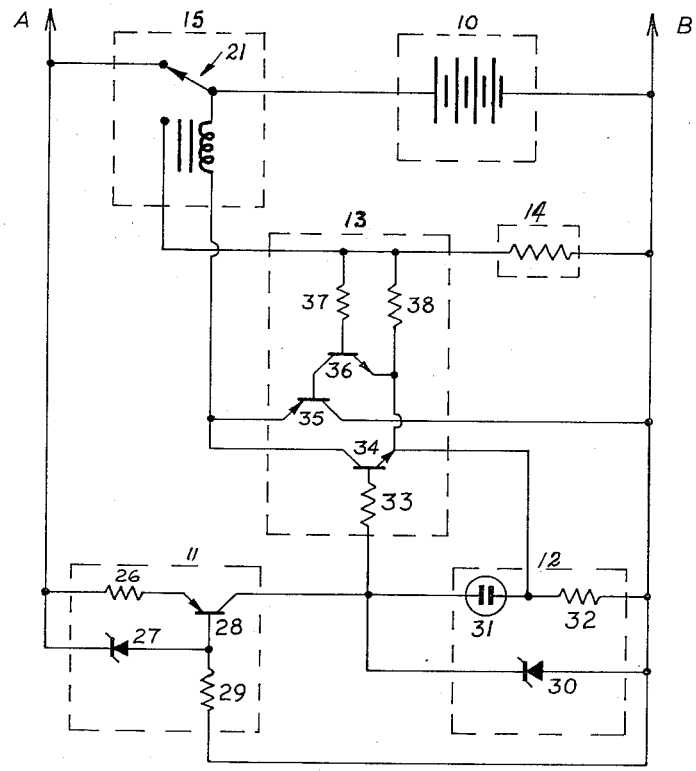
FIG. 2 is a schematic diagram showing preferred circuitry for carrying out the invention as shown in FIG. 1.

FIG. 2 is a schematic diagram showing circuitry ideally suited for performing the functions of the various blocks of FIG. 1. In FIG. 2, the blocks of FIG. 1 are illustrated by the dashed line boxes having the same numerals. Thus, switch 15 is shown as being a single-pole, double-throw relay 21. Relay 21 is normally in its closed position, as shown, except during the discharge cycle. When switch 15 is closed, battery 10 is connected to terminals A and B. In place of the electromechanical relay shown for switch 15, solid state switching devices or other suitable switches could, of course, be utilized for this switch.

The components of the constant current regulator 11 comprise a standard form of constant current regulator wherein a zener diode 27 and a resistor 29 fix the potential of the base of the transistor 28. The collector current of transistor 28 is always such that the voltage drop across the resistor 26 is always a fixed value and thus the current delivered to coulometer 12 is always a fixed value.

The element 31 of coulometer 12 maintains a low voltage drop until after a given specific quantity of current has flown through it. When this specific quantity of current is reached the voltage drop across element 31 abruptly rises. This voltage forward biases the base emitter junction of the transistor 34 through the resisor 33 causing transistor 34 to activate relay 21. The activation of relay 21 disconnects the battery 10 from terminal A and connects it to substitute load 14.

In addition to the power drawn by load 14, power is also drawn from battery 10 through the resistor 38 to cause the negative side of the coulometer element 31 to become more positive than the zener voltage of the zener diode 30, thus reversing the current flow through the coulometer element 31. The resistor 32 connected to coulometer element 31 is used for current limiting. This resets the coulometer preparing it for the next timing cycle.

The current flowing through resistor 38 causes the transistor 36 to be forward biased through the resistor 37; thereby, turning on the transistor 35 which holds relay 21 in the discharging position for battery 10 until the voltage across the coulometer element 31 rises to a value which terminates the current flow. When the current flow terminates relay 21 returns to its normal state, as shown in FIG. 2.

The circuit will also terminate battery discharge if the battery voltage falls below the value which will not drive sufficient current through resistor 38, thus protecting battery 10 from excessive discharge during the cycling period. Since the discharge period lasts for a specified period of time if controlled only by coulometer 12, an under capacity battery would be excessively discharged if provision were not made to terminate discharge when battery 10 reaches a given voltage value. Thus, this system will not damage the battery 10 as it loses capacity with age.

Figure 3:
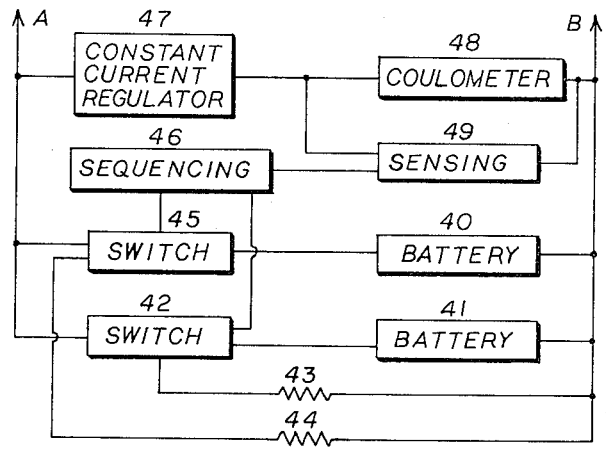
FIG. 3 shows an embodiment of the invention in which power is available during the cycling period.

FIG. 3 shows a second embodiment of the invention wherein two batteries are used and only one of them is cycled at any given time. The terminals A and B of FIG. 3 are connected to the batteries 40 and 41 through the switches 45 and 42, respectively. The constant current regulator 47 in series with the coulometer 48 and the sensing unit 49 function the same as regulator 11, coulometer 12 and sensing unit 13 of FIG. 1, the operation of which is fully described above. In response to signals from sensing unit 49, either battery 40 is removed from terminal A and connected to the substitute load 44 by means of switch 45, or battery 41 is removed from terminal A and connected to the substitute load 43 by means of switch 42. Which battery is disconnected from terminal A and connected to its associated substitute load is determined by the sequencing unit 46. Sequencing unit 46 is a common switching unit that merely first switches one of the batteries and then in response to later signals from sensing unit 49 switches the second battery to its substitute load. During the next discharge cycle the first battery will again be switched to its substitute load and so on in this alternating fashion. Thus, the batteries 40 and 41 are alternately discharged during successive cycling periods. Only one battery is disconnected from terminals A and B at any given time. Therefore, power is available from at least one battery.

The block diagram of FIG. 3 may be implemented with the same type of circuit shown in FIG. 2. However, relay 21 of FIG. 2 would be replaced by a stepping type relay or other conventional stepping device to implement sequencing unit 46 and thereby properly operate switches 45 and 42. Of course, additional batteries and appropriate switches can be added to the circuit.

Figure 4:
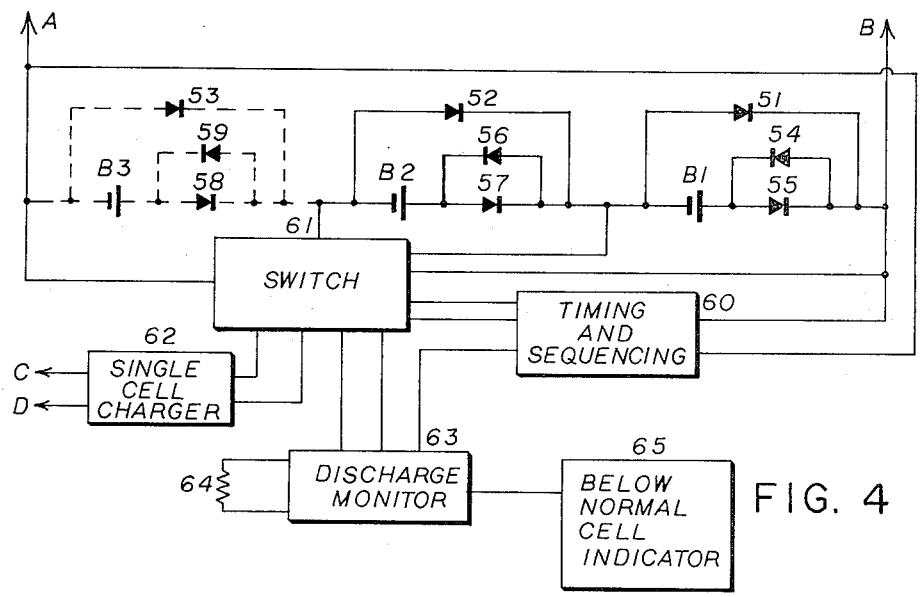
FIG. 4 shows a second embodiment of the invention in which power is available during the cycling period.

FIG. 4 shows a block diagram of a system which will provide power during cycling periods without the necessity of an additional battery. Additional provisions are shown for the maintenance of a high reliability battery system. As in the previous examples of this invention terminals A and B represent the connections to the charging equipment.

The battery cells $B_1$, $B_2$ and $B_3$ are connected in series to form a battery pack of the desired voltage. The diodes 51, 52, 53, 54, 55, 56, 57, 58 and 59 are inserted in the battery pack in a manner which prevents cell reversal of any one of the cells during discharge of the pack. The timing and sequencing control 60 may contain, as in the previous examples, a coulometer and constant current regulator. At the pre-set specified time, control 60, through the switch 61, initiates a discharge of one of the cells $B_1$, $B_2$ and $B_3$. At each timing cycle a different cell will be discharged. As the cell is discharged the monitor 63 checks for a given capacity in this cell and if the cell does not meet specifications the discharge monitor 63 activates the indicator 65. After the cell has been discharged it is brought back to full charge by the cell charger 62. Thus, during any cycle period no more than one cell of the battery of the many cells $B_1$, $B_2$ through $B_n$ will be discharged and very nearly normal power is available at all times. In addition, any defective cell will be indicated within the cycle period. A defective cell will not significantly affect the performance of the battery from the time it is indicated until it is replaced, since the diodes 51, 52 and 53 act to shunt it. When the battery is originally designed for the power supply, it may contain extra cells so that the loss of one or more may have only a slight effect on the performance of the power supply system. The terminals C and D represent connections to the utility power lines.

Figure 5:
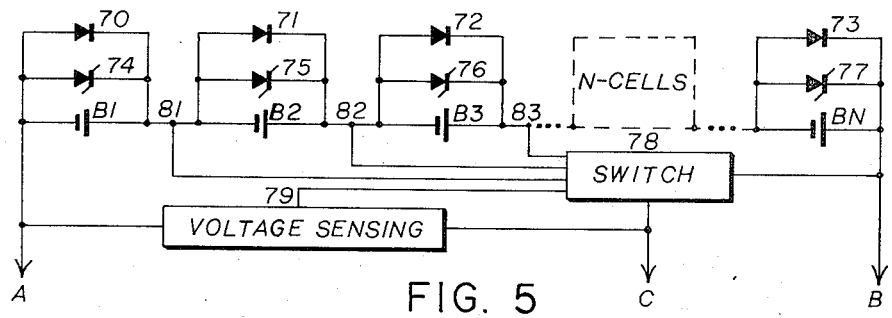
FIG. 5 shows a control network ideally suited for use with the system of FIG. 4.

The sequencing system shown in FIG. 5 is ideally suited for use with the maintenance system shown in FIG. 4. The terminals A and B are the terminals of the normal battery charger, and in addition, a maintenance system of this invention as described above would be connected to these terminals. The load is connected across terminals A and C in FIG. 5.

The battery pack $B_1$ through $B_n$ is maintained in a fully charged state by the normal charger of the power supply. The voltage sensing unit 79 monitors the voltage applied to the load between the terminals A and C and causes switch 78 to select a tap point 81, 82, 83 and etc. from the battery pack which will place a sufficient number of cells across the terminals A and C to maintain the desired voltage. If any cell should become defective switch 78 will select a higher tap from the battery so as to compensate for the defective cell. The bad cell will be shunted by one of the diodes 70 through 73, depending on which is the bad cell, thus allowing the remainder of cells of the battery pack to function normally. As the cells become exhausted, switch 78 will continue to add more cells to maintain the proper voltage to the load. When the cell-pack is recharged the zener diodes 74 through 77 prevent over-charge of their associated individual cell and therefore cause the charging current to be distributed to those cells which have been discharged.

In the FIG. 4 embodiment of the invention it is apparent that, the one cell can appear to be defective because it is going through its maintenance cycle. The sequencing system of FIG. 5 will compensate for this maintenance cycle of a cell so that there is no apparent effect at the load. The sequencing system of FIG. 5 merely adds another cell to maintain the predetermined proper voltage.

While the invention has been described with reference to specific embodiments, it will be apparent to those skilled in the art that various changes and modifications can be made to the embodiments disclosed without departing from the spirit and scope of the invention as set forth in the appended claims.

What is claimed is:

1. A battery power supply automatic maintenance cycling system comprising:
    a battery normally coupled across a battery charger;
    a coulometer for measuring time coupled to said battery;
    a dummy load; and
    means responsive to said coulometer for automatically uncoupling said battery from said battery charger after a predetermined period of time and coupling said battery to said dummy load to discharge said battery and then uncoupling said battery from said dummy load and recoupling said battery to said battery charger after said battery has been discharged for a predetermined period of time that is measured by said coulometer.

2. A battery power supply automatic maintenance cycling system as defined in claim 1 wherein a constant current regulator is connected in series with said coulometer.

3. A battery power supply automatic maintenance cycling system as defined in claim 2 wherein said means responsive to said coulometer includes a voltage responsive switch coupled to said battery, said battery charger and said dummy load such that said battery is coupled to said dummy load as long as a voltage is applied to said switch and is coupled to said battery charger when no voltage is applied to said switch.

4. A battery power supply automatic maintenance cycling system as defined in claim 3 wherein said coulometer provides a first voltage when said battery has been coupled across said battery charger for a predetermined period and a second voltage when said battery has been coupled across said dummy load for a predetermined period of time and wherein sensing and reset means are coupled between said coulometer and said switch to provide a voltage to said switch to uncouple said battery from said battery charger and couple said battery to said dummy load in response to said first coulometer voltage and to remove said voltage from said switch in response to said second coulometer voltage to recouple said battery to said battery charger.

5. A battery power supply automatic maintenance cycling system as defined in claim 4 wherein no power is available to an external load during the time said battery is coupled to said dummy load.

6. A battery power supply automatic maintenance cycling system as defined in claim 5 wherein at least one additional battery is connected in parallel with said battery.

7. A battery power supply automatic maintenance cyling system comprising:
    a first battery normally coupled to a battery charger;
    a second battery normally coupled to said battery charger;
    time measuring means coupled to said first battery and said second battery;
    a first dummy load;
    a second dummy load; and
    means responsive to said time measuring means for automatically uncoupling said first battery from said battery charger after a predetermined period of time and coupling said first battery to said first dummy load to discharge said frist battery and then uncoupling said first battery from said first dummy load and recoupling said first battery to said battery charger after said first battery has been discharged for a predetermined period of time that is measured by said time measuring means, and for automatically uncoupling said second battery from said battery charger a predetermined period of time after said first battery is recoupled to said battery charger and coupling said second battery to said second dummy load to discharge said second battery and then recoupling said second battery to said battery charger after said second battery is discharged and then after another predetermined period of time again uncoupling said first battery from said battery charger and coupling said first battery to said first dummy load to discharge said first battery and then recoupling said first battery to said battery charger after said first battery is discharged and then after still another period of time repeats the steps of uncoupling said second battery from said charger and coupling it to said second dummy load and then back to said charger whereby said first battery and said second battery are alternately discharged and charged periodically.

8. A battery supply automatic maintenance cycling system as defined in claim 7 wherein said means responsive to said time measuring means comprises a sequencing switch and sensing and reset means coupled to said time measuring means.

9. A battery power supply automatic maintenance cycling system as defined in claim 8 wherein said time coulometer means comprises a coulometer and constant current regulator coupled in series across said battery.

10. A battery power supply automatic maintenance cycling system as defined in claim 9 wherein more than two batteries normally coupled across said battery charger are provided and a number of dummy loads equal in number to the total number of batteries is provided and wherein all said batteries provided are alternately, one at a time, uncoupled from said battery charger, coupled to their respective loads for discharge and then recoupled to said battery charger.

11. A battery power supply automatic maintenance cycling system comprising:
    a battery having a plurality of cells coupled in series to a battery charger;
    time measuring means coupled to said battery;
    a dummy load; and
    means responsive to said time measuring means for automatically uncoupling all of said cells, alternately, one at a time, from said charger and coupling the one cell uncoupled from said charger at that time to said dummy load to discharge that said cell then recoupling this said cell to said battery charger whereby all of said cells are alternately discharged and charged one at a time.

12. A battery power supply automatic maintenance cycling system as defined in claim 11 wherein said means responsive to said time measuring means includes a sequencing switch coupled to said time measuring means.

13. A battery power supply automatic maintenance cycling system as defined in claim 12 wherein said time measuring means comprises a coulometer and constant current regulator coupled across all of said cells.

14. A battery power supply automatic maintenance cycling system as defined in claim 13 wherein a discharge monitor is coupled to said dummy load and wherein an indicator for indicating a defective cell is coupled to said discharge monitor.

15. A battery power supply automatic maintenance cycling system as defined in claim 14 wherein power is available to an external load at all times including the times at which a cell is being discharged.

16. A battery power supply automatic maintenance cycling system as defined in claim 15 wherein terminals are provided for connecting a number of said cells to an external load and wherein cell switching means are provided to vary the number of said cells coupled to said terminals so that a predetermined voltage is available to said external load, said cell switching means being so designed that one or more cells are automatically added to the number of cells then coupled to said terminals when one or more cells become defective, the number of cells added being equal in number to the number of defective cells, said cell switching means responding to a cell under discharge as being a defective cell during discharge, whereby said predetermined voltage is available to said external load at all times.

* * * * *